United States Patent [19]

Allen

[11] 4,287,941

[45] Sep. 8, 1981

[54] PLASTIC MOLD NEGATIVE PRESSURE COOLING SYSTEM

[75] Inventor: Paul E. Allen, Newtown, Conn.

[73] Assignee: Logic Devices, Inc., Bethel, Conn.

[21] Appl. No.: 80,631

[22] Filed: Oct. 1, 1979

[51] Int. Cl.³ .................. F28D 15/00; B29F 1/08
[52] U.S. Cl. ..................... 165/70; 165/DIG. 24; 165/104.32; 55/193; 55/189; 249/79; 264/219
[58] Field of Search ........... 165/107 D, 70, DIG. 24; 55/189, 195, 192, 193; 249/79, 80, 81; 264/219

[56] References Cited

U.S. PATENT DOCUMENTS

| | | | |
|---|---|---|---|
| 1,219,320 | 3/1917 | Jacobus | 55/189 X |
| 3,525,098 | 8/1970 | Vox | 165/48 X |
| 3,565,986 | 2/1971 | Byall | 249/79 X |
| 3,608,624 | 9/1971 | Hasselriis | 165/197 D X |
| 4,047,561 | 9/1977 | Jaster et al. | 165/197 D X |
| 4,091,069 | 5/1978 | Allen | 249/79 X |

*Primary Examiner*—Albert W. Davis
*Attorney, Agent, or Firm*—Thomas L. Tully

[57] ABSTRACT

A negative pressure cooling system for cooling passageways in plastic molds includes a closed reservoir that is maintained under a high vacuum by a vacuum fluid pump with the outlet of the cooling passageway being connected to the reservoir inlet and with the reservoir outlet being connected to the cooling passageway inlet through a pressure pump and a fluid pressure regulator.

7 Claims, 1 Drawing Figure

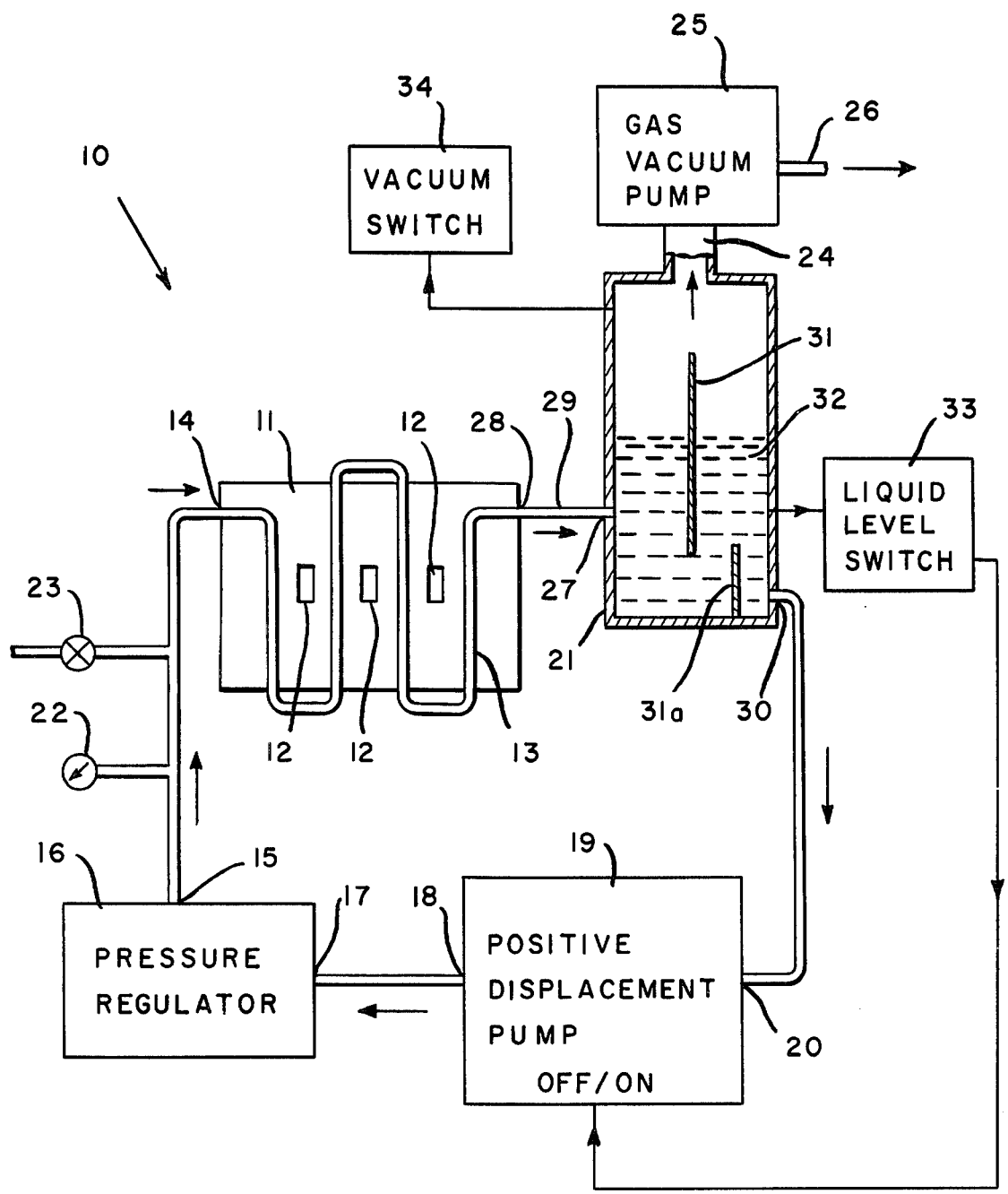

PLASTIC MOLD NEGATIVE PRESSURE COOLING SYSTEM

In my copending application, Ser. No. 733,812, assigned to the assignee of the present invention, and entitled "Cooling System For Plastic Molds", there is disclosed a system for supplying cooling fluid to a plastic injection molding machine with the fluid, at least within the mold cooling passageways being under a negative pressure. The system includes a positive displacement pump having its inlet directly connected to the mold outlet and a fluid pressure regulator having its outlet directly connected to the mold inlet. The system is connected to have the pump discharge fluid from the mold into a reservoir from which a source pump pumps the fluid to the pressure regulator thereby circulating the fluid through the mold.

While such a system has been found satisfactory in functioning to minimize leakage in a mold die having an undesired communication between a cooling passageway and a mold cavity in addition to otherwise permitting alterations in heretofore known mold design techniques, difficulties have arisen in some areas under certain conditions. Thus, for example, air or other gas entrapped in the cooling fluid tends to remain in certain kinds of liquids rather than leave the liquids when the reservoir is open to the atmosphere. The entrapped air may produce foaming which interferes with the heat transfer between the mold and the fluid. Further, it has been found desirable not to be limited to a single type of source pump and also to form a closed system in which the temperature of the fluid may be relatively precisely maintained in an economical manner.

It is accordingly an object of the present invention to provide a negative pressure plastic mold heat transfer system which tends to minimize the entrapment of air or other gases in the cooling fluid.

Another object of the present invention is to achieve the above object with a system which is economical to manufacture and in which temperature altering devices for the heat transfer fluid may be easily incorporated therewith.

A further object of the present invention is to achieve the advantages of heretofore known negative pressure heattransfer systems with a system that is easily incorporated with a molding machine and relatively inexpensive to manufacture and operate and which is reliable and durable in use.

In carrying out the present invention, there is provided, as in my prior system, a reservoir, a positive displacement pump and a fluid pressure regulator. The reservoir, however, is closed to the atmosphere except that there is a gas vacuum pump having an inlet communicating with the top interior of the reservoir to maintain the reservoir at a high vacuum. The positive displacement pump is connected to remove fluid from the bottom of the reservoir and transport is under pressure to the regulator. As in the prior systems, the regulator is connected to the mold cooling duct inlet. However, the mold cooling duct outlet is connected directly to the reservoir rather than to the inlet of a positive displacement pump.

With this described system, a high vacuum is still applied to the mold outlet, fluid at essentially atmospheric pressure is applied to the mold inlet and the mold itself thus serves as the factor for basically controlling the quantity of cooling fluid flowing therethrough. Moreover, in the reservoir, the surface of the fluid is subjected to a high vacuum which in turn, induces the flow of gas from the fluid to thereby minimize the amount of gas that is retained within the fluid.

Other features and advantages will hereinafter appear.

In the drawing, the sole FIGURE is a diagrammatic and block representation of the closed negative pressure system of the present invention.

Referring to the drawing, the closed system of the present invention is generally indicated by the reference numeral 10 and is utilized to cool a mold 11 having a plurality of cavities 12 and a cooling passageway 13. The mold passageway includes an inlet 14 connected to the outlet 15 of a pressure regulator 16 having an inlet 17 connected to the output 18 of a positive displacement pump 19. The pump 19, in turn, has its inlet 20 connected to cause flow of fluid as a liquid from a reservoir 21 by being connected to the bottom thereof. The mold inlet may also have connected thereto a pressure gauge 22 and an air bleed valve 23.

The mold 11 while diagrammatically shown as having three cavities may take any desired shape as may the cooling passageway which are shown merely as a single serpentine configuration. The air inlet 23, gauge 22, pressure regulator 16 and positive displacement pump are more fully disclosed in my above-noted copending application.

In accordance with the present invention, a reservoir 21 has an outlet 24 which is connected to the inlet of a gas vacuum pump 25, the latter as shown, unless objectionable for environmental purposes, being discharged into the atmosphere through its outlet 26. One type of pump that may be employed is sold under the name Sihi Pumps, Grand Island, N.Y. and is capable of maintaining in the reservoir 21, a vacuum approaching 25 inches of mercury. The size of the vacuum pump is related to the expected air that will have to be discharged in order to maintain the desired vacuum within the reservoir.

The inlet 27 to the reservoir is connected to the outlet 28 of the cooling passageway by a duct 29 which does not have any flow restricting devices.

In addition, the reservoir positions between the inlet 27 and the outlet 30 to the positive displacement pump, baffles 31 and 31a to subdivide the upper levels of the fluid 32 in the reservoir in order to prevent cross-over flow of the gas containing fluid being emitted from the inlet 27 from flowing directly to the outlet 30 of the reservoir.

It has also been found desirable to provide a liquid level switch 33 for controlling the on-off operation of the pump 19 to assure that the pump will not function if there is insufficient fluid in the reservoir. Further, rather than have the vacuum pump 25 be continuously operated, a vacuum switch 34 is preferably employed to cause the pump 25 to be actuated only when the reservoir vacuum is less than a selected value.

One value that may be used is 22 inches of mercury which is just slightly more than the pumps capacity. Further, the value selected is required to be less than the inlet vacuum that the positive displacement pump is capable of producing which typically may be on the order of 28 inches of mercury. This small difference assures that the pump 19 will be able to transfer liquid from the reservoir. The capacity of the pump 19 need only be that required to move the desired volume of cooling liquid as it does not pump a gaseous mixture as may the pump disclosed in my above-noted patent application.

While most applications of the present invention are anticipated to involve cooling of molds, other applications may involve heating of molds. For convenience, the terms cooling fluid and cooling fluid are employed and should be assumed to cover both types of heat transfer applications. Further, while only one cooling system has been shown connected to the mold, it may be desirable at times to connect two systems for alternate heating and cooling.

It will be seen that with the present constructions, the air is capable of being induced to leave any fluid 32 in the reservoir by the surface of the fluid being at a very high vacuum as opposed to being just atmospheric as in the prior embodiment. Moreover, the present invention carries out the concept disclosed and claimed in the prior application of providing essentially a free flow communication between the mold outlet and a source of vacuum and the regulator and the mold inlet so that the quantity of fluid flowing through the mold is basically determined by the configuration of the mold and not be exterior factors such as valves, etc.

Variations and modifications may be made within the scope of the claim and portions of the improvements may be used without others.

I claim:

1. A system for transferring heat between a plastic injection mold and a transfer liquid with the mold having a liquid passageway having an inlet and an outlet, a closed reservoir for transfer liquid having an inlet and an outlet, means for maintaining the interior of the reservoir at a high vacuum, means connecting the outlet of the liquid passageway to the inlet of the reservoir, and a pump means having an inlet connected to the outlet of the reservoir and an outlet connected to the inlet of the liquid passageway with said pump means producing a higher vacuum at its inlet than the high vacuum maintained in the interior of the reservoir.

2. The invention as defined in claim 1 in which there are baffle means within the reservoir for preventing direct flow between the inlet and outlet of the reservoir.

3. The invention as defined in claim 1 in which the quantity of transfer liquid in the reservoir is less than the capacity of the reservoir to thereby provide an upper portion of the reservoir that is free of transfer liquid.

4. The invention as defined in claim 3 in which the means for maintaining the reservoir at a high vacuum includes a fluid vacuum pump having an inlet communicating with the upper portion.

5. The invention as defined in claim 3 in which the transfer liquid is located at the bottom portion of the reservoir and in which the outlet of the reservoir is located in the bottom portion.

6. The invention as defined in claim 1 in which said pump means is a positive displacement pump means, and a fluid pressure regulator is present having its inlet connected to the outlet of said pump means and having its outlet connected to the inlet of said liquid passageway to maintain the liquid entering said liquid passageway at substantially atmospheric pressure.

7. The invention as defined in claim 6 in which the connection between the reservoir inlet and the transfer passageway outlet is free of flow restricting devices and in which the connection between the regulator output and the transfer passageway inlet is free of flow restricting devices whereby the mold transfer passageway basically sets the quantity of fluid flowing through the transfer passageway.

* * * * *